United States Patent
Lin

(10) Patent No.: US 7,249,882 B2
(45) Date of Patent: Jul. 31, 2007

(54) METHOD FOR DETERMINING INTEGRATION INITIAL VALUE OF PID CONTROLLER

(75) Inventor: Ching-Yi Lin, Taoyuan Hsien (TW)

(73) Assignee: Delta Electronics Inc., Taoyuan (TW)

( * ) Notice: Subject to any disclaimer, the term of this patent is extended or adjusted under 35 U.S.C. 154(b) by 181 days.

(21) Appl. No.: 11/249,415

(22) Filed: Oct. 14, 2005

(65) Prior Publication Data

US 2007/0084750 A1    Apr. 19, 2007

(51) Int. Cl.
G01K 3/00    (2006.01)
G01K 3/04    (2006.01)
G01K 3/08    (2006.01)
G01K 3/10    (2006.01)

(52) U.S. Cl. .................... 374/101; 374/102
(58) Field of Classification Search ............. 374/101, 374/102
See application file for complete search history.

(56) References Cited

U.S. PATENT DOCUMENTS

| | | | | |
|---|---|---|---|---|
| 5,259,389 A | * | 11/1993 | Muramoto et al. | 600/546 |
| 5,709,198 A | * | 1/1998 | Sagisaka et al. | 123/684 |
| 5,762,839 A | * | 6/1998 | Kamiguchi et al. | 264/40.6 |
| 7,021,822 B2 | * | 4/2006 | Shen | 374/53 |
| 2002/0182382 A1 | * | 12/2002 | Hirabayashi et al. | 428/195 |
| 2004/0052565 A1 | * | 3/2004 | Takeishi et al. | 400/283 |

* cited by examiner

Primary Examiner—Joseph Chang

(57) ABSTRACT

A method for determining integration initial value of PID controller is applied to obtain an integration initial value for temperature control and to fast eliminate stability error. This method uses a set temperature value and temperature error setting to perform on-off switching with the range of temperature error setting after an automatic tune is activated. An amplitude for the highest and the lowest temperature curve is obtained. An integration is calculated based on the amplitude, the temperature value and the lowest temperature to obtain an estimated control initiation value for PID controller performing temperature. A stabilizing integration value is added when temperature is near a preset value to reduce temperature reaction time. Therefore, the dilemma of temperature overshoot caused by fast reaction and low reaction to prevent temperature overshoot can be solved.

7 Claims, 5 Drawing Sheets

METHOD FOR DETERMINING INTEGRATION INITIAL VALUE OF PID CONTROLLER

BACKGROUND OF THE INVENTION

1. Field of the Invention

The present invention relates to a method for determining an integration initial value of a PID controller, especially to a method for determining an integration initial value of a PID controller, wherein the integration initial value is added to integrator of the PID controller when the temperature is approaching the set value, thus reducing steady state time and preventing temperature overshoot.

2. Description of Prior Art

The temperature control is extensively used for modern industry. The stable temperature control is essential in industry such as textile, dye, car lacquer in conventional industry, cool storage and cake making in food industry, optical disk manufacture and PCB manufacture in electronic industry.

The temperature control for a system is preferably performed to achieve set temperature rapidly without overshoot. However, actually dilemma is inevitable wherein overshoot occurs when the set temperature can be rapidly reached, the set temperature cannot be rapidly reached when the overshoot is to be suppressed.

The PID controller is often used for temperature control, wherein PID stands for proportion, integration and differentiation. The proportion control sets the output being proportional to error amount and the output is increased with larger error. The integration control is used to eliminate steady-state error and generates larger output when the error is large. The differentiation control can fast achieve steady state based on error variation. However, the prior art PID controller has difficulty to fast achieve set temperature without overshoot.

FIGS. 1 to 4 show the control principle, block diagram and curve for a prior art PID controller, wherein Kp (proportional constant), Ti (integration time) and Td (differentiation time) are parameters used for PID control and the error value is equal to set temperature subtracting actual temperature. The control output can be calculated based on formula (1) below:

$$\text{control output} = [(1+1/TiS+TdS) \times Kp] \times error \quad (1)$$

The P parameter is proportional parameter and stands for a proportion relationship between output value and error value (set temperature subtracting actual temperature). The output is increased for large error value and the output value is decreased for smaller error value, as shown in FIG. 2. The output value can be calculated based on formula (2)

$$y = 100/PB \times X + 50$$

where $Kp = 100/PB$, PB is proportion band, and Kp is proportional constant

50% indicates control output at error free condition.

The output value is 50% when the error amount is 0, it means the set temperature being equal to the actual temperature. The system does not have steady-state error when the temperature is stable in this value. In fact, the output value might be any value between 0% to 100% instead of 50% when the error value is 0. The output value might not be fixed value even for the same system and drifted with external environment. Therefore, the steady state condition cannot be achieved only by proportion control.

The D parameter is an adjustable parameter (Kp), wherein the temperature reaction is fast and the set temperature is liable to be exceeded when Kp is large; the temperature reaction is slow and the set temperature is not liable to be exceeded when Kp is small.

The I parameter is also referred to as integration parameter or integration control and is used to eliminate control error. The integration control is expressed as formula (3) when error is present in the temperature.

$$y = Ki \times \int X dt + y_0$$

$$ki = Kp \times 1/Ti, X \text{ is error value} \quad (3)$$

In above formula, the error value for each second is added and then multiplied by a constant to obtain an output value y to eliminate temperature error. As shown in FIG. 3, the operation amount is increased due to integration when the error value is large. The integrator will not perform integration when error value is 0, namely, the measured temperature is equal to the set temperature.

In the I control of the prior art PID controller; the nitration is performed from 0 to the set temperature. Therefore, the I parameter control is a lengthy processing for obtaining stable temperature. As shown by the temperature verse integration time curve (Ti), the temperature may be dropped in the integration control process.

SUMMARY OF THE INVENTION

The present invention is intended to provide a method for determining integration initial value of PID controller. This method uses a set temperature value and temperature error setting to perform on-off switching with the range of temperature error setting after an automatic tune is activated. An amplitude for the highest and the lowest temperature curve is obtained. An integration is calculated based on the amplitude, the temperature value and the lowest temperature to obtain an estimated control initiation value for PID controller performing temperature. The estimated control initiation value can be added when the temperature is approaching the set temperature value to reduce reaction time. Therefore, the dilemma of temperature overshoot caused by fast reaction and low reaction to prevent temperature overshoot can be solved.

To achieve above object, the present invention provides a method for determining integration initial value of PID controller and comprising the steps of:

performing a setting step to set a temperature setting value and a temperature error setting value;

performing a parameter generation step to activate an automatic tuning, wherein an on-off switching for output control is performed to obtain an amplitude curve with highest temperature and lowest temperature;

performing a calculation step to calculate an estimated initial value based on the integration of the amplitude and the temperature difference;

adding the estimated initial value when the temperature is approaching the set temperature value for achieve the set temperature with shorter reaction time and without overshoot.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

A setting step 100 is performed to set a temperature setting value E and a temperature error setting value, wherein the temperature error setting value comprises positive and negative error setting value F, G based on the temperature adjusting value E.

A parameter generation step 102 is performed to activate automatic tuning (AT ON). After the automatic tuning is activated, on-off switching is generated between the positive and negative error setting value F, G to control output, thus obtaining an amplitude curve A with highest and lowest temperature.

A calculation step 104 is performed to calculate an estimated integration initial value according to formula (4) based on the temperature difference B between the temperature setting value E and the lowest temperature H in the amplitude curve A.

$$\text{Control initial value } I=(B-G)/(A-G)(\%) \quad (4)$$

The estimated initial value I is added to stabilize integration value as the temperature is approaching the set value, during the control process of the integration (I) of the PID controller, Therefore, the reaction time to obtain the set temperature can be saved, and the overshoot can be prevented.

Figure 1:
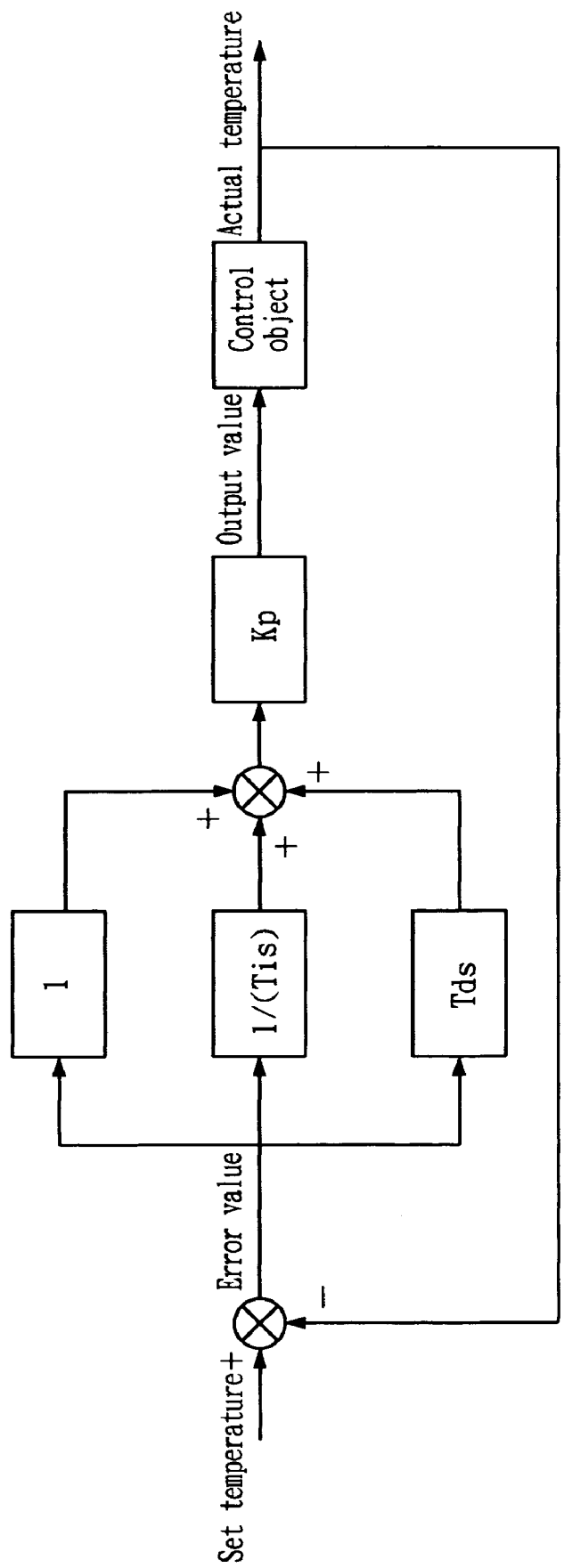
FIG. 1 shows the principle of a prior art PID controller.
Figures 2, 3:
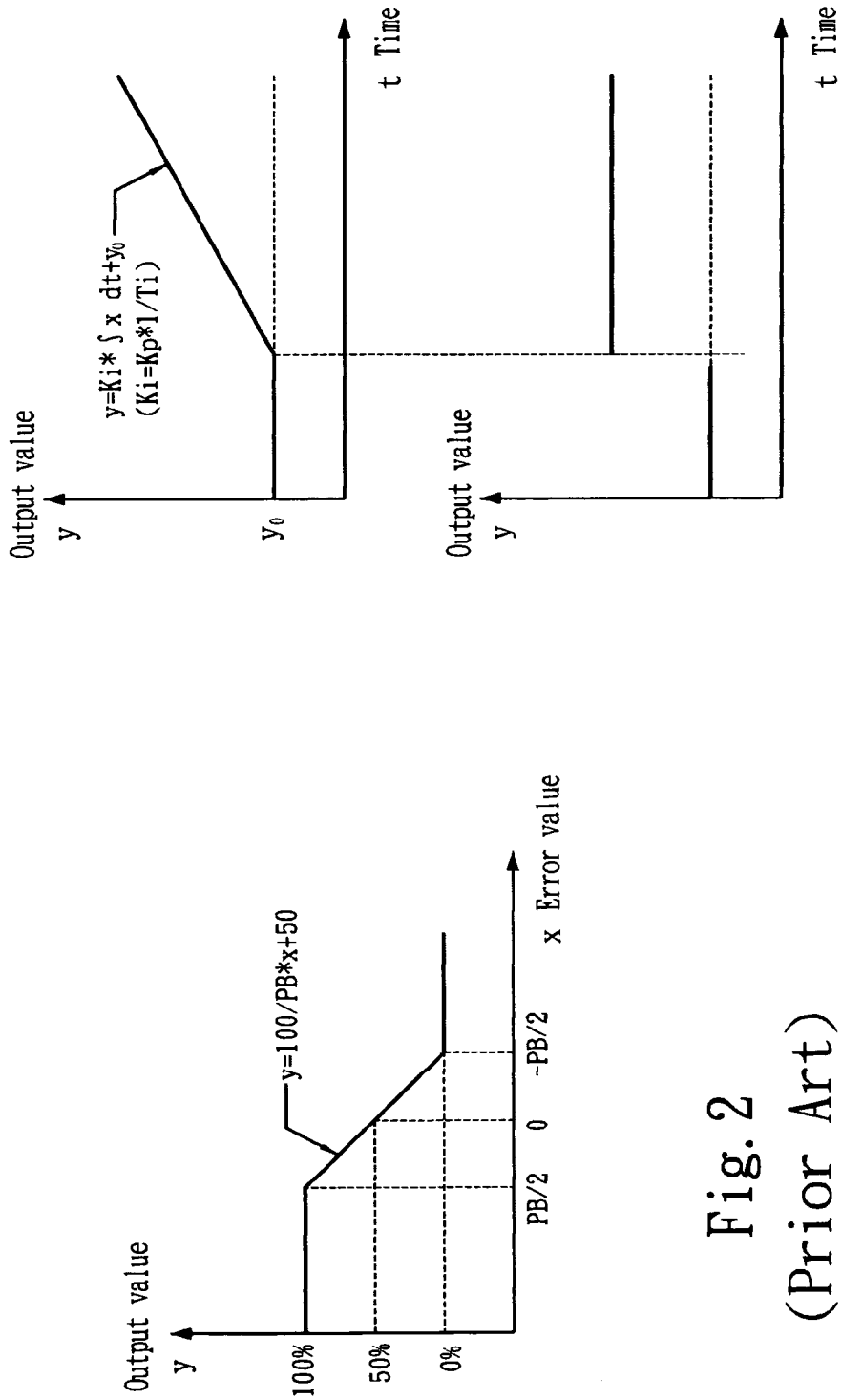
FIG. 2 shows the P parameter curve of a prior art PID controller.
FIG. 3 shows the I parameter curve of a prior art PID controller.
Figure 4:
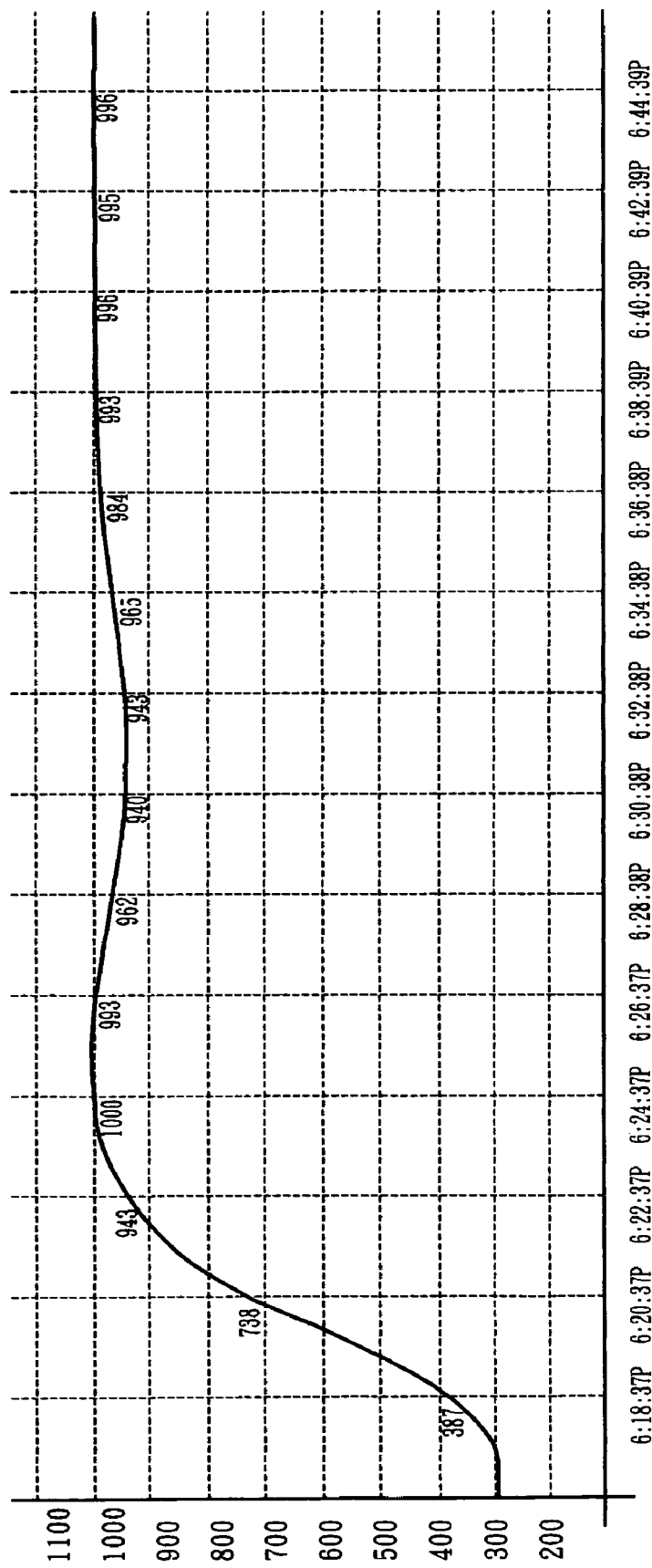
FIG. 4 shows the temperature of prior art PID controller verse integration time (Ti).
Figure 6:
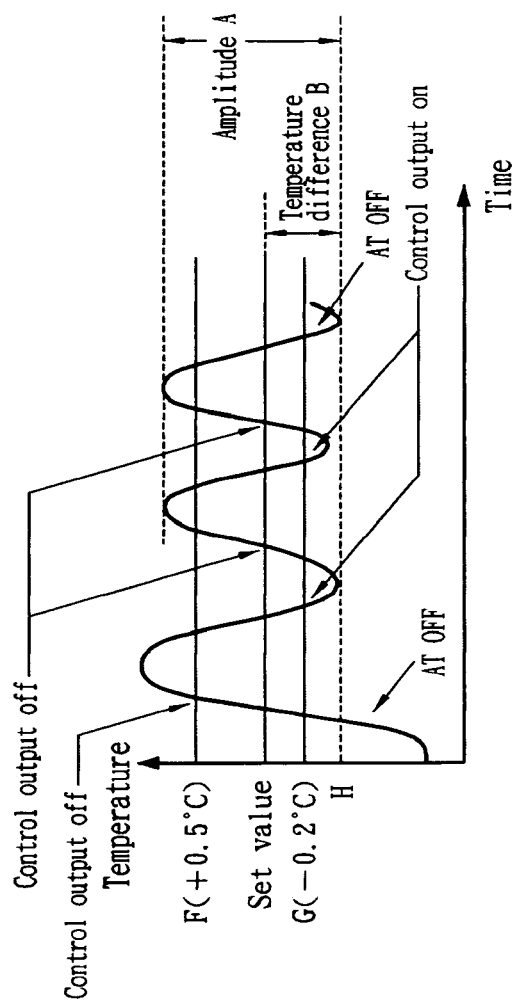
FIG. 6 shows the waveform for auto tuning in the present invention.
Figure 5:
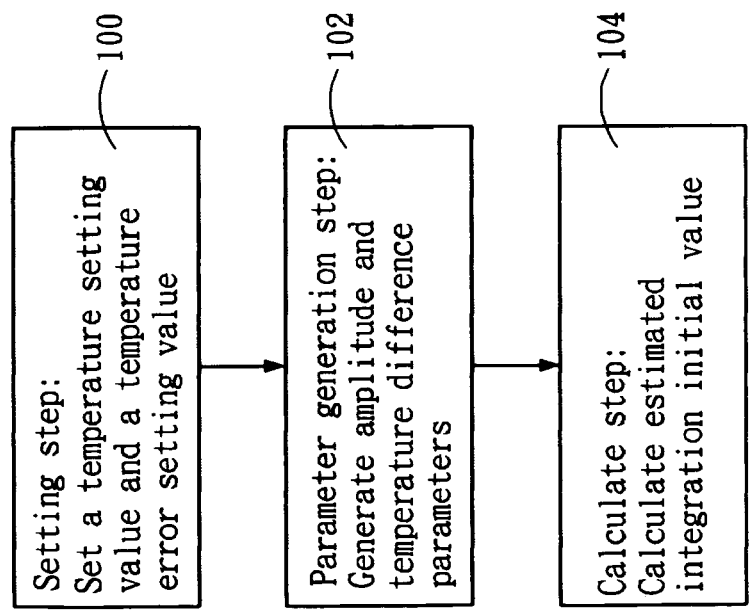
FIG. 5 shows a process flow according to a preferred embodiment of the present invention.
Figure 7:
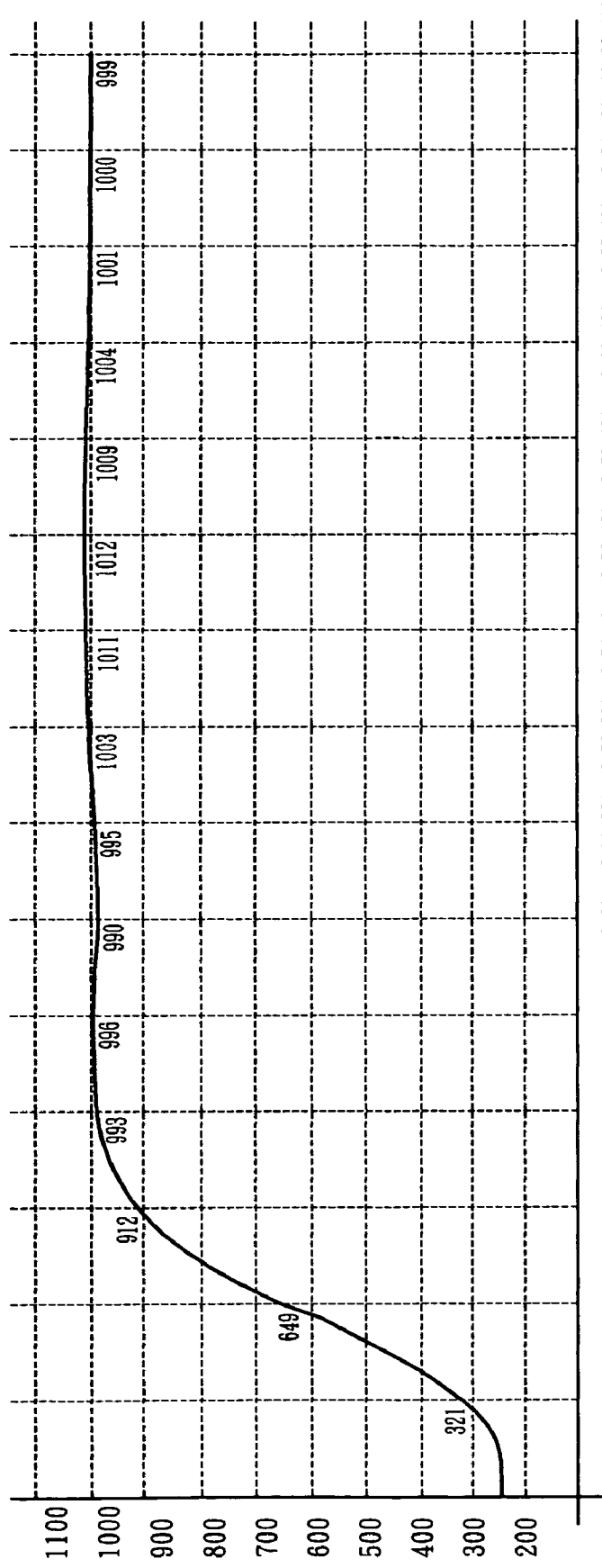
FIG. 7 shows the temperature of PID controller verse integration time (Ti) in the present invention.

FIGS. 6 and 7 show the method of the present invention is applied to a first preferred embodiment where the temperature and integration time (Ti) are shown. In the setting step the temperature setting value E and a temperature error setting value are set, wherein the positive error setting value F is+0.5° C., and the negative error setting value G is −0.2° C. In the parameter generation step, after the automatic tuning is activated, the control output is set to be ON to raise temperature until the temperature exceeds the positive error setting value F. If the temperature exceeds the positive error setting value F, the control output is set to be OFF. The temperature is decreased until the temperature is below the negative error setting value G. Afterward, the control output is set to be ON until the temperature exceeds the positive error setting value F. In this way, the amplitude A and temperature difference B (the difference between the temperature setting value E and the lowest temperature H) can be obtained. Afterward, the estimated initial value can be calculated according to formula (4).

$$\text{The estimated initial value } I=(B-0.2)/(A-0.2)(\%)$$

The estimated initial value I can be used as initial value of PID controller and the PID controller does not perform integration from 0. There is no dropping in intermediate temperature. As shown in FIG. 7, there is also no overshoot.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for determining an integration initial value of a PID (proportion, integration and differentiation) controller, comprising the steps of:
    a) performing a setting step to set a temperature setting value and a temperature error setting value;
    b) performing a parameter generation step to activate an automatic tuning, wherein an on-off switching for output control is performed to obtain an amplitude curve with highest temperature and lowest temperature;
    c) performing a calculation step to calculate an estimated initial value based on the integration of the amplitude and the temperature difference; and
    d) using the estimated initial value for integration control of the PID controller to reduce the reaction time for achieve the set temperature.

2. The method as in claim 1, wherein the temperature error setting value comprises a positive error setting value F and a negative error setting value G, which can be set variably.

3. The method as in claim 1, wherein the on-off switching is conducted to set an ON state for control output when the temperature is below the positive error setting value F, the on-off switching is conducted to set an OFF state for control output when the temperature exceeds the positive error setting value F, the on-off switching is conducted to set the ON state for control output when the temperature is below the positive error setting value F, the on-off switching is conducted to set the OFF state again when the temperature exceeds the temperature error setting value.

4. The method as in claim 1, wherein the highest temperature is a maximum temperature for the amplitude curve where the output control is ON to rise temperature to exceed the positive error setting value F and then the output control is ON and the temperature keep raising for while; wherein the lowest temperature is a minimal temperature for the amplitude curve where the output control is changed from OFF to ON and the temperature keep lowering for while.

5. The method as in claim 1, wherein the temperature difference is the difference between the temperature setting value and the lowest temperature.

6. The method as in claim 1, wherein the estimated initial value is calculated by dividing the difference of temperature difference B subtracting the negative error setting value G by the amplitude A subtracting the negative error setting value G.

7. The method as in claim 1, further comprising:
    adding the estimated initial value when the temperature approaching the temperature setting value to stabilize integration and prevent overshoot.

* * * * *